United States Patent
Talbot et al.

(12)

(10) Patent No.: US 6,242,023 B1
(45) Date of Patent: Jun. 5, 2001

(54) METHOD OF PREPARING A MULTIFOOD COMPONENT

(75) Inventors: Michael L. Talbot, Lenexa; James C. Cross, Overland Park, both of KS (US)

(73) Assignee: Shade Foods, Inc., New Century, KS (US)

( * ) Notice: Subject to any disclaimer, the term of this patent is extended or adjusted under 35 U.S.C. 154(b) by 0 days.

(21) Appl. No.: 09/352,223

(22) Filed: Jul. 13, 1999

Related U.S. Application Data

(62) Division of application No. 09/100,046, filed on Jun. 19, 1998, now abandoned.

(51) Int. Cl.[7] ................................ A23G 1/20; A23F 5/00
(52) U.S. Cl. ...................... 426/103; 426/297; 426/306; 426/517
(58) Field of Search ..................... 426/103, 517, 426/297, 303, 305, 306, 307; 99/450.2; 264/171.1

(56) References Cited

U.S. PATENT DOCUMENTS

| | | |
|---|---|---|
| 2,874,649 | 2/1959 | Pelletier ................................ 426/297 |
| 4,410,552 | 10/1983 | Gaffney et al. ....................... 426/103 |
| 4,580,489 * | 4/1986 | Haas, Sr. et al. .................... 99/450.4 |
| 4,778,685 * | 10/1988 | Simelunas et al. ................... 426/297 |
| 4,847,090 | 7/1989 | Della Posta et al. ................. 426/103 |
| 4,911,937 | 3/1990 | Crosello et al. ...................... 426/103 |

OTHER PUBLICATIONS

The Good Cook Candy, pp. 58–59, 77; 1981.

* cited by examiner

*Primary Examiner*—Nina Bhat
(74) *Attorney, Agent, or Firm*—Hovey, Williams, Timmons & Collins

(57) ABSTRACT

A method and an apparatus for the preparation of composite food products is provided wherein the apparatus (10) has a conveyor (12), a pair of spaced-apart primary and secondary apertured rakes (18, 20), a cooling tunnel (22), a cutting device (24) and a packaging system (25). In use, a first, relatively high viscosity food material (36) is deposited upstream of the primary rake (18) so as to drag or pull the first material through the rake (18) as continuous streams (40). The streams (40) are partially cooled and relatively low viscosity second material (38) is applied thereover adjacent the secondary rake (20). At the secondary rake (20), the second material (38) is pulled through the rake apertures to form continuous streams or sections (42) of the material (36) disposed around the inner sections formed by the streams (40). The composite streams are then cooled in the tunnel (22) and cut by the device (24).

9 Claims, 1 Drawing Sheet

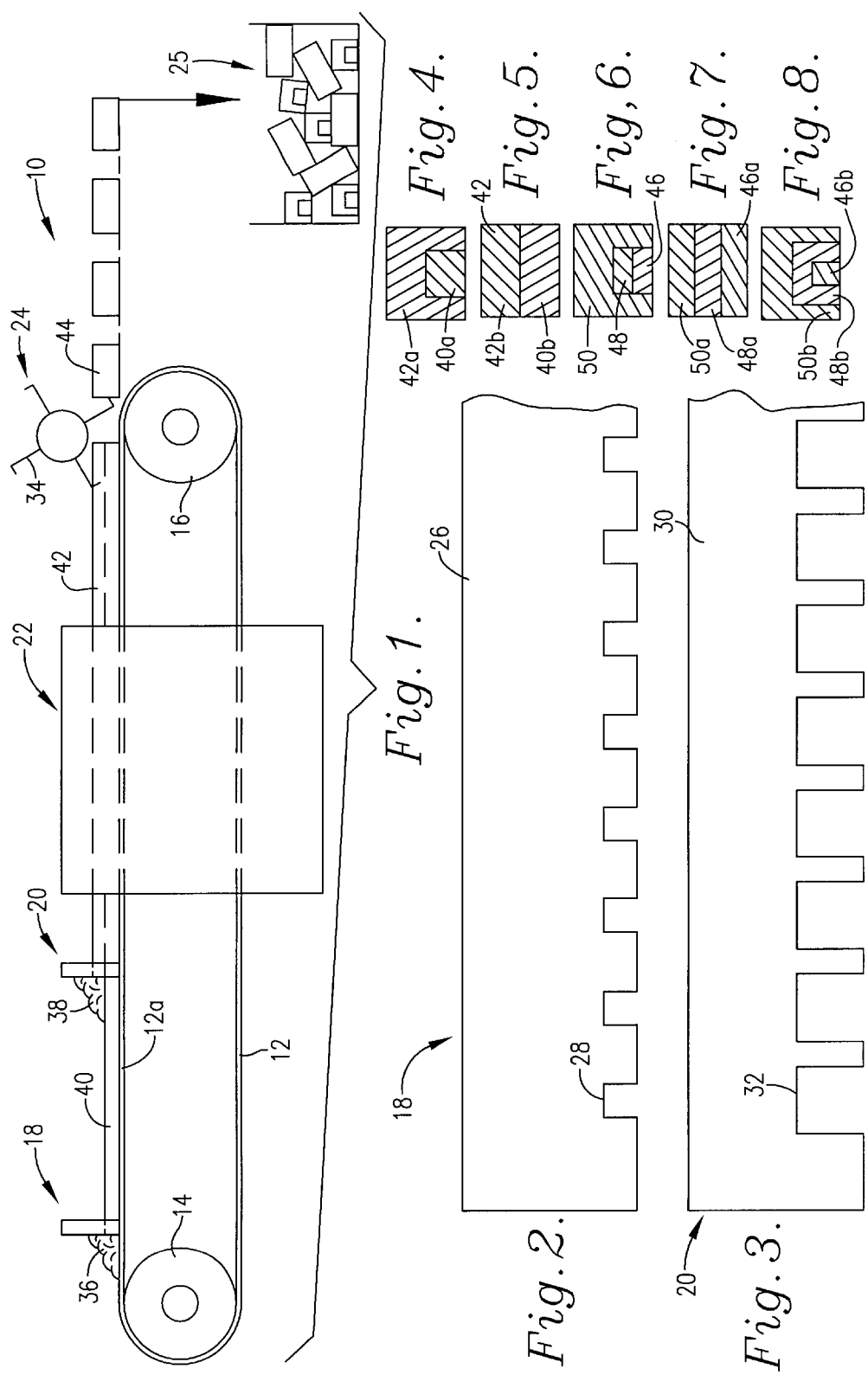

METHOD OF PREPARING A MULTIFOOD COMPONENT

RELATED APPLICATIONS

This is a division of Ser. No. 09/100,046 filed Jun. 19, 1998, now abandoned.

BACKGROUND OF THE INVENTION

1. Field of the Invention

The present invention is broadly concerned with novel composite food products which can be formulated as chunks having a length on the order of ¼"–1" for use as inclusions in cookies, ice creams, and similar products. More particularly, the invention relates to such composite foods, and methods of fabrication thereof, wherein the products include two or more discrete, substantially homogeneous materials (e.g., orange/chocolate, peppermint/chocolate) extending the full length of the products. The products are prepared by sequentially forming an initial stream of a first material on a moving support followed by applying a separate material thereover, thus eliminating the need for conventional extrusion processing.

2. Description of the Prior Art

Many types of composite food products have been prepared by co-extrusion techniques employing confectionary extruders and appropriate extruder dyes. Generally, products of this character are tubular in cross-sectional configuration, and the equipment used is both complex and costly. It has also been known to make Neapolitan-type products via casting, such as ice creams or chocolates having side-by-side layers of different food materials. These processes do not however yield small chunk-type products of variable configuration which are self-sustaining in shape at room temperature.

Flat chips or chunks are a popular ingredient used with frozen desserts, baked items, breakfast cereals and confectionary products. They typically include sugar, fats (e.g., cocoa butter or partially hydrogenated vegetable oil) and other ingredients. Square and rectangularly shapes have been produced in the past with dimensions varying from 0.125"–0.75" and thicknesses from 0.125"–0.5". These chips or chunks are manufactured by dragging a liquid or flowable mass such as molten chocolate through a forming device having small openings or slots formed therein. Immediately after the forming operation, the resultant strips are cooled to solidify the mass, and the strips are cut to desired lengths. Many different food flavors and colors can be incorporated into these prior products. However, there has been no way to produce composite products made up of discrete materials using these techniques.

There is accordingly a need in the art for an improved process, and resultant chunk-type product, wherein composite food products made up of two or more discrete materials can be readily and inexpensively form.

SUMMARY OF THE INVENTION

The present invention overcomes the problems outlined above and provides a method of preparing composite food products employing very simple equipment which is inexpensive to fabricate and operate. Broadly speaking, the method of the invention involves first forming an elongated, continuous stream of a first food material on a moving support such as a conveyor belt. Thereafter, a second flowable food material is applied over the continuous stream of the first material to form a composite, and the composite is cooled to render it substantially shape-retaining at room temperature. In the final steps of the process, the composite is divided by cutting or the like to form chunks, preferably having a length of from about ¼"–1".

In preferred forms, the initial forming step involves providing an upright, apertured primary rake adjacent the moving support, depositing a quantity of the first material adjacent the upstream face of the primary rake, and causing the moving support to drag or pull the first material through the primary rake apertures to form the streams. These streams are then cooled to increase the structural integrity thereof, so that application of the second food material over the streams does not unduly distort or distend the streams. The second material is applied in a manner similar to that of the first material, i.e., a secondary rake is positioned adjacent the moving support downstream of the primary rake. The secondary rake likewise is apertured, with the secondary rake apertures having a greater cross-section of area than those of the primary rake, and with the corresponding apertures of the rakes being in center-to-center alignment. The application of the second material is carried out so as to avoid as much as possible any shape alteration of the underlying streams of first material.

The cooling step is advantageously accomplished by passing the composite streams emerging from the secondary rake through a cooling tunnel. Cooling air currents are directed through the tunnel to fully solidify and set the composite streams.

A variety of product shapes can be prepared using the methods of the invention. To give but one example, novel chunk products can be readily prepared having an inner section of square or cross-sectional configuration and an outer, generally U-shaped section disposed about the inner section. Likewise, numerous specific food materials can be used in making the composites hereof, such as fruit-flavored materials (orange, apple, lime, lemon), and confectionary materials (chocolate, caramel, peppermint, peanut butter).

BRIEF DESCRIPTION OF THE DRAWINGS

FIG. 1 is a schematic side view of a dual-rake forming apparatus used in the production of two-component composite food products of the invention, and also depicts the steps involved in the process;

FIG. 2 is a fragmentary front view depicting the smaller opening primary rake used in the apparatus of FIG. 1;

FIG. 3 is a fragmentary front view illustrating the larger opening secondary rake used in the FIG. 1 apparatus;

FIG. 4 is a vertical sectional view of the final product prepared using the apparatus of FIGS. 1–3;

FIG. 5 is a vertical sectional view of another composite in accordance with the invention, made with two rectangular layers of materials;

FIG. 6 is a vertical sectional view of another composite in accordance with the invention, made with two inner sections and a surrounding outer section;

FIG. 7 is a vertical sectional view of another composite in accordance with the invention, made with three rectangular layers of materials; and FIG. 8 is a vertical sectional view of another composite in accordance with the invention, made with three generally U-shaped layers of materials.

DETAILED DESCRIPTION OF THE PREFERRED EMBODIMENTS

Turning now to the drawings, and particularly FIG. 1, an exemplary apparatus 10 for producing the composite products of the invention is illustrated. Broadly speaking the apparatus 10 includes an endless metallic conveyor 12 supported on a pair of endmost rollers 14, 16, as well as a pair of forming rakes 18, 20, cooling tunnel 22, rotary knife assembly 24, and packaging apparatus 25.

The conveyor 12 may be formed of stainless steel or any other suitable metallic material having the appropriate heat conductive properties. In normal commercial operations, the upper run 12*a* of the conveyor 12 would have a length of perhaps 75–125 feet, commonly around 100 feet. The width of the conveyor is variable, but typically is from 4–8 feet. Although not shown, a water/glycol cooler may be placed beneath the upper run 12*a* of the conveyor to maintain the temperature thereof within the range of about 40–70° F.

The primary rake 18 is in the form of an upright food grade metal (e.g., stainless steel) or synthetic resin plate 26 having a series of openings 28 spaced laterally across the plate. As shown in FIG. 2, the openings are square in configuration, although the invention is in no way limited to any particularly opening shape.

The secondary rake 20 is very similar, and is also formed as an upright plate 30 made of food grade metal or synthetic resin and having laterally spaced apart openings 32 (see FIG. 3). The openings 32 are for purposes of examples shown as square in shape, but again, any one of a number of shapes could be employed. It is important, however, that the cross-sectional areas of the openings 32 in the secondary rake 20 be greater than the corresponding cross-sectional areas of the primary rake openings 28; moreover, the openings 28 and 32 should be arranged in center-to-center alignment across the width of the conveyor 12.

Although not shown in detail, it will be understood that the rakes 18, 20 are maintained in their upright positioned by means of conventional support structure secured to the frame of the overall machine or to any other stationary structure.

The cooling tunnel 22 is equipped with a series of indirect heat exchange coils through which a coolant such as a water/glycol mixture is passed. Appropriately sized fans (not shown) are used to direct air currents over the cooling coils, in order to establish and maintain the correct cooling air temperature within the tunnel 22.

The rotary cutter 24 is entirely conventional and includes a series of cutter knives 34 serving to cut the product into chunks of desired size. These chunks are then delivered to the packaging apparatus 25.

In the use of apparatus 10, at least two food compositions are prepared and are respectively deposited adjacent the upstream faces of the rakes 18,20. Considering first the initial food material 36, as shown in FIG. 1, it can be deposited essentially as a mass next to the upstream face of rake 18. This material would normally be heated so that it is flowable under the influence of the moving conveyor belt 12. Typically, the material 36 would be heated to a temperature within a range of 80–120° F., more preferably 90–100° F. As deposited, this material would preferably have a viscosity (Brookfield 10 rpm) of from about 50,000–150,000 cps, more preferably from about 80,000–120,000 cps. It is also important that the material 36 have the property of at least partially setting during passage between the primary and secondary rakes; that is, the material 36 should have sufficient structural integrity upon preliminary cooling thereof between the primary and secondary rakes to avoid significant distortion as the second material is applied thereover.

The second material 38 is also normally heated before application to the belt 12. Again, the material 38 would normally have a temperature of from about 80–120° F., more preferably 90–100° F. The viscosity of the material 38 is normally lower than that of the first material 36, in order to insure that the material 38 readily and evenly flows over the partially set material 36. Specifically, the material 38 should have a Brookfield viscosity of from about 10,000–40,000 cps, more preferably of from about 20,000–30,000 cps.

Again referring to FIGS. 1–3, it would be observed that the material 36 is pulled through the primary rake openings 28 during movement of belt 12, thus forming a series of elongated, continuously, laterally-spaced apart product streams 40. As noted previously, these streams 40 would at least partially set during travel thereof between the rakes 18, 20. At the upstream face of the secondary rake 20, the material 38 is carefully deposited onto the belt 12 in a manner to minimize any distortion of the streams 40. This is accomplished by pouring or "dribbling" the material 38 over the moving streams 40. Given the fact that the material 38 has a relatively low viscosity, it flows over the streams 40 and is pulled through the larger openings 32 of the secondary rake 20. This forms a continuous stream or section 42 of the material 38 around the inner section formed by the streams 40.

During passage through the cooling tunnel 22, the composite streams made up of inner streams 40 and outer streams 42 are cooled and substantially solidified until they become fully shape-retaining. Advantageously, the composite streams would have a temperature in the range of 40–70° F. After cutting via the cutter 24, the resultant chunks 44 of any convenient length would have a cross-section similar to that depicted in FIG. 4, with an inner section 40*a* and an outer section 42*a*.

It will be appreciated that the configuration of products in accordance with the invention can be varied or altered in a wide variety of ways. For example, FIG. 5 depicts a two-component product having a lowermost rectangular section 40*b* surmounted by a similarly shaped upper section 42*b*. In this instance, the primary and secondary rakes would have openings of equal width, although the secondary rake would have openings of greater height. FIGS. 6–8 illustrate three-component products which are made using three spaced apart rakes and correspondingly have three sections 46,48 and 50 (FIG. 6). In the case of the FIG. 6 product, if the same material was used for the sections 46 and 50, the product would be essentially tubular in cross-sectional configuration. In FIG. 7, the three sections 46*a,* 48*a* and 50*a* are each of identical cross-sectional configuration and are mounted one atop the other. Finally, FIG. 8 illustrates a three-component composite having a square innermost section 46*b,* and a pair of U-shaped outer sections 48*b,* 50*b.*

The following examples set forth preferred techniques for the production of the layered food products of the invention. It is to be understood however that these examples are provided by way of illustration only and nothing therein should be taken as a limitation upon the overall scope of the invention.

EXAMPLE 1

In this example, composite food product chunks or chips were prepared having a central section formed of orange flavored material with an outer section of chocolate. These composite products were bakeable and could be used as an inclusion in products such as cookies. The following table sets forth the ingredients for the respective sections.

TABLE 1

|  | Orange Central Section | Chocolate Outer Section |
| --- | --- | --- |
| Ingredients (% by wt) |  |  |
| Sugar | 54.0 | 45.2 |
| Dextrose | 6.0 | 6.0 |
| Nonfat Dry Milk Powder | 5.0 | — |
| Wheat Flour | 3.0 | 3.0 |
| Cocoa (11% fat) | — | 12.0 |
| Citric Acid | 1.0 | — |
| Orange Food Coloring | 0.5 | — |
| Orange Oil | 0.5 | — |
| Vanilla | — | 0.1 |
| Palm Kernel Oil (100° F. m.p.) | 29.8 | 33.2 |
| Soy Lecithin | 0.2 | 0.5 |
| Properties |  |  |
| Total Calculated Fat Content (% by wt) | 30.0 | 35.0 |
| Viscosity at 110° F. (cps, Brookfield 10 rpm) | 90,000 | 20,000 |
| Particle Size (micrometer, μm) | 25–30 | 25–30 |

In forming the chunk products, a pair of metallic rakes as depicted in FIGS. 3 and 4 were positioned in spaced apart relationship adjacent to the upper run of a six-foot wide, cooled metal conveyor belt. The primary rake had a series of spaced-apart ¼"×¼" square openings formed therein and was positioned upstream of the secondary rake. The latter was located approximately six feet from the primary rake and had a series of ½"×½" openings therein; it is important that the secondary rake openings were positioned in center-to-center alignment with the primary rake openings. The conveyor belt passed through a conventional cooling tunnel downstream of the rakes, and a rotary cutting knife was positioned at the end of the belt run, all as schematically illustrated in FIG. 1.

In product forming operations, the conveyor belt was moved around the supporting rollers and, during such movement, a mass of the above orange material (100° F.) was deposited adjacent the upstream face of the primary rake as depicted in FIG. 1. As the conveyor was advanced, respective, generally square in cross-section streams of the orange material were formed on the conveyor belt downstream of the primary rake. The chocolate material (100° F.) was then deposited adjacent the upstream face of the secondary rake in a manner to avoid distortion of the still somewhat warm and malleable orange material; this can be done by carefully pouring the chocolate material to avoid depositing a large agglomeration or mass of the chocolate which may have the tendency of flattening or distorting the orange material. Owing to the configuration and size of the secondary rake openings, an outer section of chocolate was formed over the orange streams. Again, given that the secondary rake openings were square in cross-section and aligned with the primary rake openings, the overall shape of the product emerging from the secondary rake was square, with an outer section of chocolate material disposed about the orange inner section.

The composite streams from the secondary rake were then passed into and through a cooling tunnel as illustrated in FIG. 1. The air temperatures within the cooling tunnel were maintained at a level of about 60–70° F., and the residence time of the composite streams in the tunnel was about 5–15 minutes in order to set the composite streams. After cooling the individual streams were passed to the end of the upper run of the conveyor where the rotary cutter was used to cut the streams into chunks of approximately ½" in length, and having a cross-sectional appearance illustrated in FIG. 2. After cutting, the chunk final product was conventionally packaged.

EXAMPLE 2

In Example 1, the finished product had a central orange section which made up 25% by volume and an outer chocolate section constituting the remaining 75% by volume. These volumetric ratios can readily be altered by appropriate sizing of the rake openings. The following table sets forth some of these possibilities:

TABLE 2

| Primary Rake Openings | Secondary Rake Openings | % by Volume Inner Section | % by Volume Outer Section |
| --- | --- | --- | --- |
| 0.25" × 0.25" | 0.33" × 0.33" | 56 | 44 |
| 0.25" × 0.25" | 0.375" × 0.375 | 44 | 56 |
| 0.33" × 0.33" | 0.375" × 0.375" | 79 | 21 |
| 0.33" × 0.33" | 0.5" × 0.5" | 44 | 56 |
| 0.375" × 0.375" | 0.5" × 0.5" | 56 | 44 |

EXAMPLE 3

In this example, green peppermint/chocolate chunks designed for inclusion in ice cream products were prepared. The formulations of the inner and outer section materials are set forth in Table 3.

TABLE 3

|  | Peppermint Central Section | Chocolate Outer Section |
| --- | --- | --- |
| Ingredients (% by wt) |  |  |
| Sugar | 66.4 | 55.7 |
| Lactose | 5.0 | — |
| Cocoa Powder (11% fat) | — | 6.0 |
| Cocoa Liquor (55% fat) | — | 13.0 |
| Green Food Coloring | 0.45 | — |
| Peppermint Oil | 0.05 | — |
| Vanilla | 0.1 | 0.1 |
| Coconut Oil (76° F. m.p.) | 27.8 | 24.7 |
| Soy Lecithin | 0.2 | 0.5 |
| Properties: |  |  |
| Calculated Total Fat | 28% | 33% |
| Viscosity at 100° F. (cps, Brookfield 10 rpm) | 95,000 | 25,000 |
| Particle Size (micrometer, μm) | 25–30 | 25–30 |

The procedure used in preparing the peppermint/chocolate chunk products of this example were the same as set forth in Example 1, except that the temperatures of the peppermint and chocolate materials as deposited on the conveyor were about 90° F., and the air temperature within the cooling tunnel was maintained at a level of about 40–50° F.

Those skilled in the art will appreciate that a variety of other food materials can be used in the composites of the invention, both in the inner and outer sections thereof. Additionally, other shapes can readily be formed, e.g., hemispherical or rectangular in cross-section products could be prepared. Finally, while the foregoing examples describe two-component composites, similar composites having three or more layers of materials can be fabricated. The latter involves use of a corresponding number of aligned rakes, with the rake openings being in center-to-center alignment and with the downstream rake openings being larger than those upstream. See for example FIGS. 6–8 which illustrate representative forms of three-layer composites.

We claim:

1. A method of preparing a composite food product comprising the steps of:

forming a plurality of laterally spaced-apart continuous streams of a first food material on a moving support, said streams each presenting a bottom surface having spaced side margins and in contact with said support, and an outer surface including respective sidewall portions extending upwardly from said side margins and a top wall portion extending between said sidewall portions, said forming step comprising the steps of providing an upright, apertured primary rake adjacent said moving support, depositing a quantity of said first material adjacent the upstream face of said primary rake, and causing the moving support to pull said first material through said primary rake apertures to form said stream;

applying a second flowable food material over said continuous streams to form a plurality of laterally spaced-apart composites on said support, said second food material coating and in contact with at least said top wall portions of said streams, and with said second food material defining an outer exposed surface of said composites, said applying step comprising the steps of providing an apertured secondary rake downstream of said primary rake, depositing said second material adjacent the upstream face of said secondary rake, and causing the support to pull said second material through said secondary rake apertures;

cooling the composites to render them substantially shape-retaining; and dividing the composites to form said food product.

2. The method of claim 1, including the step of applying said second material over said streams without substantially distorting the cross-sectional shape of the streams.

3. The method of claim 1, including the step of cooling said streams prior to said applying step.

4. The method of claim 1, said cooling step comprising the steps of passing said composites on said support through a cooling tunnel, and directing cooling air currents through the tunnel for cooling of the composites.

5. The method of claim 1, said dividing step comprising the step of cutting said composites into chunks.

6. The method of claim 1, said first food material having a viscosity of from about 50,000–150,000 cps, and said second food material having a viscosity of from about 10,000–40,000 cps.

7. The method of claim 1, said first food material having a temperature of from about 80–120° F. and said second food material having a temperature of from about 80–120° F.

8. The method of claim 1, said second food material comprising chocolate.

9. The method of claim 1, said second food material coating and in contact with the top wall portion and said sidewall portions of each of said streams.

* * * * *